G. OSBERG & W. JOHANSON.
TRUING-UP GAGE.
APPLICATION FILED MAR. 29, 1917.

1,236,748.

Patented Aug. 14, 1917.

Inventors.
Gustaf Osberg
Waldemar Johanson
by Heard Smith & Tennant.
Attys

UNITED STATES PATENT OFFICE.

GUSTAF OSBERG AND WALDEMAR JOHANSON, OF BOSTON, MASSACHUSETTS.

TRUING-UP GAGE.

1,236,748.  Specification of Letters Patent. Patented Aug. 14, 1917.

Application filed March 29, 1917. Serial No. 158,426.

*To all whom it may concern:*

Be it known that we, GUSTAF OSBERG, a citizen of the United States, and WALDEMAR JOHANSON, a subject of the King of Sweden, residing at Boston, county of Suffolk, State of Massachusetts, have invented an Improvement in Truing-Up Gages, of which the following description, in connection with the accompanying drawing, is a specification, like characters on the drawing representing like parts.

This invention relates to truing-up gages which are designed for use in assisting in truing up work in a lathe or in determining whether or not the centers of a lathe are in alinement. The device comprises a body adapted to be held either between the dead center of a lathe and the work, or between the dead and live center of a lathe, an indicating finger extending laterally from said body, and a gage over which the end of the indicating finger plays. The construction is such that when the body with the indicating finger is placed between the dead center and the work and the head stock is rotated any inaccuracies in the alinement will be indicated by a vibrating movement of the indicating finger.

In order to give an understanding of our invention, we have illustrated in the drawings some selected embodiments thereof which will now be described, after which the novel features will be pointed out in the appended claim.

Figure 1:
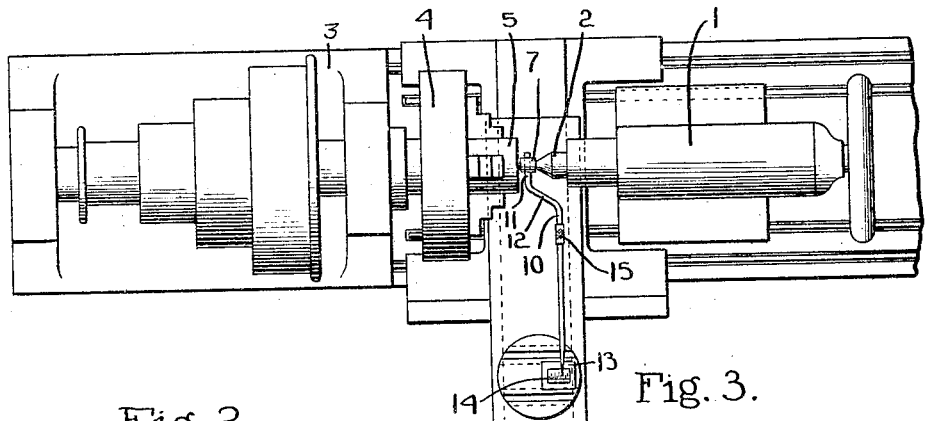
Figure 1 illustrates the device as applied to truing up work in a chuck of a lathe.

Referring first to Fig. 1, we have indicated at 1 the tail stock of a lathe having the dead center 2 therein and at 3 have shown the head of the lathe carrying a spindle provided with a chuck 4. 5 indicates a piece of work in the chuck which is provided with the centering hole 6. The device shown in Fig. 1 is designed to indicate whether the work 5 has been properly chucked so that the center hole 6 is in correct axial alinement. The device comprises a body 7 having in one side a recess or aperture 8 adapted to receive the point of the dead center 2. This aperture is so shaped that the tapered end of the center 2 engages the edge 18 of the recess so that the head is free to have a rocking movement on said center. On the opposite side, the device is provided with a centering point 9 which is adapted to enter the center recess 6 in the work 5. The body is provided with a transversely-extending aperture in which is received one end 11 of an indicating finger 10. The end 11 of the indicating finger is preferably tapered slightly so that when it is firmly forced into the aperture, it will be frictionally held in place. This indicating finger is provided with the offset or laterally-bent portion 12 so that the body of the finger is situated opposite the tail stock. 13 indicates an index member which is provided with a scale 14 over which the end of the indicating finger 10 plays. This index member may be supported on the tool post carriage of the lathe or may be placed on the bed of the lathe.

In using the device above described, it will be placed in position, as shown, with the centering point 9 in the centering recess 6 of the work 5 and with the dead center 2 entering the recess 8. The lathe will then be started thereby to rotate the chuck 4. If the work is properly centered the indicating finger 10 will remain stationary, but if the work is not properly centered, then the finger 10 will have a vibrating movement due to the eccentricity of the center recess 6, and this movement or vibration can be readily read by observing the scale 14.

We will preferably make the indicating finger in two sections which are detachably secured together at 15.

Figure 2:
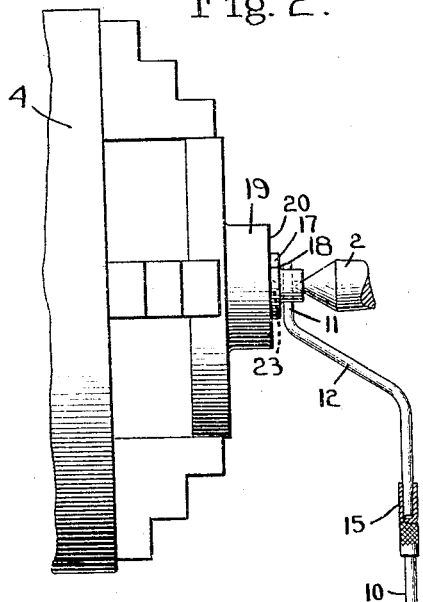
Fig. 2 is a view showing a different embodiment of the invention.

In Fig. 2 we have shown a slightly different embodiment of the invention wherein the body 17 is provided with a flat face 18. This embodiment of the invention is used for determining whether a piece of work 19 which is carried by the chuck 4 has its face 20 properly trued up. In using this embodiment of the invention the face 18 of the head 17 is held against the face 20 of the work by the dead center 2 engaging said body. The chuck is then rotated and if the face 20 is properly trued up, the indicating finger 10 will have no vibratory movement, but if the face is not properly trued up, then the finger 10 will vibrate to indicate this fact.

Figure 3:
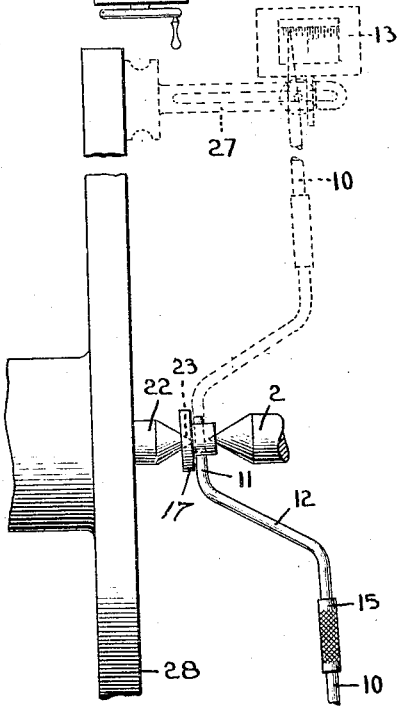
Fig. 3 shows the device as used in determining the relative arrangement of the centers of a lathe.
Figure 4:
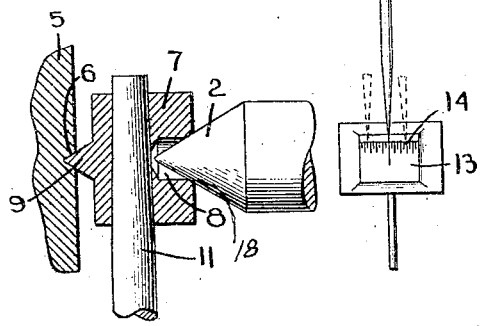
Fig. 4 is an enlarged sectional view of the head 3 showing its position in use.

In Fig. 3 we have shown the device as it might be used to assist in adjusting the tail stock so as to bring the tail stock center into correct alinement with the live center 22.

In performing some operations on a lathe, such, for instance, as turning up a tapered piece of work, it is customary to shift the tail stock center out of line with the live center. The device as shown in Fig. 3 is useful in assisting to bring the tail stock center back into correct axial alinement with the center 22. In using the device for this purpose the head 17 is held between the dead center 2 and the live center 22, said head being provided with a recess 23 in the face 18 to receive the live center. The index member 13 is sustained in a carrier 26 which is adjustably mounted on a member 27. This member 27 is placed against the face plate 28, as shown in full lines, Fig. 3, and the position of the pointer 10 on the scale 14 is noted. The member 27 as well as the index pointer 10 are swung through 180° into the dotted line position, Fig. 3, and the position of the pointer over the scale 14 is again noted. If the pointer has the same position on the scale in each of the positions of the index arm, then the tail stock center is in proper alinement, but if in the full and dotted line positions of the pointer it occupies a different position over the scale 14, then this indicates that the tail stock center is not properly alined and further adjustment is necessary.

We claim:

A truing-up gage consisting of a body having in one end a recess to receive the dead center of a lathe, the other end of said body being constructed to engage the element carried by the live spindle of the lathe, said body having an aperture extending transversely therethrough, an indicating finger frictionally held in said having one end frictionally held in said aperture and provided with an offset portion between its ends, and a stationary member situated adjacent the end of the indicating finger and carrying a scale by which the position of the finger may be read.

In testimony whereof, we have signed our names to this specification.

GUSTAF OSBERG.
WALDEMAR JOHANSON.